United States Patent [19]

Burhans et al.

[11] 4,218,360

[45] Aug. 19, 1980

[54] EPOXY RESINS FILLED WITH DUAL-SILANE TREATED HYDRATED ALUMINA

[75] Inventors: Allison S. Burhans, Millington, N.J.; Sidney E. Berger, Rye, N.Y.

[73] Assignee: Union Carbide Corporation, New York, N.Y.

[21] Appl. No.: 966,393

[22] Filed: Dec. 4, 1978

[51] Int. Cl.$^2$ .............................................. C08L 63/00
[52] U.S. Cl. ................................................ 260/37 EP
[58] Field of Search .................................... 260/37 EP

[56] References Cited

U.S. PATENT DOCUMENTS

| | | | |
|---|---|---|---|
| 3,563,939 | 2/1971 | Stevens et al. | 260/37 EP |
| 3,647,742 | 3/1972 | Stevens | 260/37 EP |
| 3,839,065 | 10/1974 | Overhults et al. | 260/37 N |
| 4,061,503 | 12/1977 | Berger et al. | 106/300 |
| 4,062,693 | 12/1977 | Berger | 106/308 Q |
| 4,105,465 | 8/1978 | Berger | 106/308 Q |

OTHER PUBLICATIONS

Plueddemann et al.; Silane Coupling Agents for Alumina Trihydrate; 31st Ann. Tech. Conf., 1976 Reinforced Plastics/Composites Inst.
Union Carbide; Simplified Test for Evaluation of Epoxy Thermal Shock Resistance; Prod. Info. Bul. F-44429; Jun., 1973.
Union Carbide; Cycloaliphatic Epoxide Systems; Product Bulletin F-42953B; Mar. 1978.

Primary Examiner—Lewis T. Jacobs
Attorney, Agent, or Firm—Richard J. Gallagher

[57] ABSTRACT

Epoxy resin composition contains particulate hydrated alumina filler treated with a first organosilane containing an organic group condensible with a carboxy group and a second organosilane which is an alkyl silane or an aryl silane.

17 Claims, No Drawings

EPOXY RESINS FILLED WITH DUAL-SILANE TREATED HYDRATED ALUMINA

This invention relates to improved epoxy resin formulations having highly desirable properties for use in electrical applications. In particular, this invention relates to epoxy resin formulations containing hydrated alumina fillers wherein the hydrated alumina fillers have a dual-silane treatment on their surfaces.

Curable epoxy resin formulations have been employed for many years in commercial electrical applications due to their excellent insulating properties. Because of their low degree of shrinkage and consequent high degree of mold fill, cured polyepoxides have found broad commercial use in potting, encapsulating, and sealing of electrical components such as coils. Another major electrical application of polyepoxides is their use as outdoor power line insulators which are used to insulate overhead power lines from their ground support structures.

Generally, the curable epoxy resin systems are characterized by a liquid polyepoxide resin containing at least two vicinal epoxy groups, a curing agent or hardener, and, if desired, other ingredients such as fillers and flexibilizers or plasticizers.

Useful polyepoxide resins fall into a variety of broad categories including the diglycidyl ethers of dihydric polynuclear phenols such as bisphenol-A; epoxy novolak resins; p-amino phenol epoxies; and cycloaliphatic epoxies (see, e.g., Madden, J., "Epoxy Resins," *Modern Plastics Encyclopedia*, Vol. 46: No. 10A, p. 123, Oct. 1969).

Epoxy resin formulations based on cycloaliphatic polyepoxide resins have become a preferred class of epoxies for use in outdoor electrical insulators. Their preferred status in these applications is due largely to their superior weatherability, arc resistance and arc tracking resistance.

The electrical and physical performance properties which are required of epoxies used in outdoor insulators are quite demanding because of the severe use conditions to which they are subject, the need for long, reliable service, and the expense and inconvenience attendant to replacing them in the field. Among the properties which are critical to the performance of outdoor insulators are: insulating properties, as measured by dielectric constant, dissipation factor and breakdown voltage; hardness; hydrolytic stability; thermal shock resistance, that is, the ability to withstand repeated cycles of high and low temperature; and arc resistance and arc tracking resistance.

Outdoor insulators are subject to accumulations of dust, rain and sundry other contaminants. Under these conditions, random electrical surface discharges known as "surface creepage" occur. Surface creepage can result in the formation of carbonaceous deposits across the surface of the insulator (i.e. tracking). The tracks thus formed provide a low resistance path which subsequent surface discharges tend to follow. Eventually, this results in failure of the insulator.

One method which has been employed to control the problem of arc tracking in polyepoxide and other polymeric insulators is to fill the resin with particles of hydrated alumina, alumina trihydrate being preferred (see, e.g., U.S. Pat. No. 3,563,939). While the mechanism is not fully understood, it is known that the hydrated alumina significantly improves arc tracking resistance.

Unfortunately, the presence of hydrated alumina is cured polyepoxides is accompanied by a marked reduction in mechanical properties such as thermal shock resistance, tensile strength and flexural strength. To a certain extent the adverse effects of hydrated alumina on the mechanical properties of the cured polyepoxide can be mitigated by treating the hydrated alumina with an organosilane coupling agent containing an organic reactive group that is condensible with the curing agent, such as an epoxy silane (see U.S. Pat. No. 3,647,742).

A problem which persists, however, with hydrated alumina filled polyepoxides is that of umanageably high viscosity in the uncured resin system. Hydrated alumina, alumina trihydrate in particular, is notorious for increasing the viscosity of resin systems into which it is incorporated. This is highly undesirable in a commercial epoxy molding operation since the liquid epoxy resin containing the hydrated alumina is normally fed to the molds using automated metering equipment. Unacceptably high viscosity can cause the resin to clog the lines and pumps, make accurate metering difficult, and slow production rates. We have found that the presence of an epoxy silane coupling agent on the hydrated alumina filler particles tends to aggravate the viscosity elevating effect which the filler has on the resin.

Thus, the art is seeking a method of providing a polyepoxide resin system which has the excellent arc and tracking resistance obtainable by the incorporation therein of hydrated alumina filler, but which does not suffer either a concomitant loss of physical properties or unacceptable increase in viscosity.

SUMMARY OF THE INVENTION

This invention is based on the discovery of epoxy resin systems containing hydrated alumina filler which display both excellent physical properties in the cured state and desirably low viscosity in the uncured state. The epoxy resin systems are characterized in that the hydrated alumina filler is treated with a combination of a first organosilane which contains an organic group that is condensible with a carboxyl group, such as an epoxy silane, and a second organosilane which contains an organic group that is essentially non-reactive with the components of the epoxy resin system other than the hydrated alumina and is chosen from alkyl silanes and aryl silanes.

While it is known that the presence of alkyl silane or aryl silane alone on the filler may reduce somewhat the viscosity of an epoxy resin system into which it is incorporated, the findings of this invention are remarkable in that the epoxy resin systems containing the hydrated alumina treated with both the epoxy silane and the alkyl silane or aryl silane display viscosities which are often lower than corresponding systems in which the hydrated alumina is treated with the alkyl silane or aryl silane alone.

Typically, by incorporating one part of alkyl silane or aryl silane per part of epoxy silane, as a co-treating agent, one can overcome the adverse effects of the epoxy silane treatment on viscosity. This is accomplished without a significant sacrifice of physical or electrical properties and, in some respects, is accompanied by improved physical or electrical properties.

Accordingly, there is provided herein an improved epoxy resin system comprising: (1) a polyepoxide resin, (2) a curing agent for the polyepoxide resin, and (3) a particulate hydrate alumina filler having on its surfaces a first organosilane containing an organic group which is condensible with a carboxyl group and a second organosilane chosen from alkyl silanes and aryl silanes.

DETAILED DESCRIPTION OF THE INVENTION

The particulate hydrated alumina filler used in this invention is defined by the formula $Al_2O_3 \cdot x\, H_2O$ wherein x has a value of from 1 to 3. Alumina trihydrate, $Al_2O_3 \cdot 3H_2O$, is particularly preferred.

The improved composition of this invention comprises hydrated alumina filled polyepoxide resin in which the filler is treated with two different organosilanes. The first organosilane is defined by the formula $$XRSiY_3$$

wherein R is a saturated hydrocarbon radical containing at least 2 carbon atoms in sequence separating X from Si and is bonded to both; X is a organic group which contains a vicinal epoxy group, i.e.

and Y is hydroxyl or a hydrolyzable group such as alkoxy, alkoxyalkoxy, aroxy, halogen, amine, and the like.

Specific illustrations of the organosilanes defined in the preceding paragraph are the following:

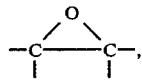

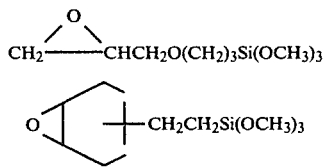

The second organosilane which is employed in accordance with this invention is alkyl silane or aryl silane and is defined by the formula $$R'SiY_3$$

wherein Y is the same as defined above and R' is alkyl of from 1 to 18 carbon atoms or

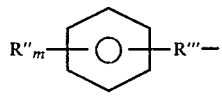

wherein R''' is alkylene of 1 to 8 carbon atoms, alkyleneoxy of 1 to 8 carbon atoms, or nothing (i.e. a valence bond); R'' in each occurrence is alkyl of 1 to 8 carbons; and m is a number having a value from 0 to 2. Preferably R' is alkyl, most preferably n-octyl.

One can mention, as illustrative of the organosilanes defined in the preceding paragraph, the following:
methyltriethoxysilane
ethyltrimethoxysilane
2-ethylhexyltrimethoxysilane
n-octyltrimethoxysilane
n-octyltriethoxysilane
dodecyltrimethoxysilane
octadecyltrimethoxysilane
phenyltriethoxysilane
phenyltrichlorosilane
phenyltrimethoxysilane The first organosilane defined above (i.e. containing the vicinal epoxy group) can be present in the compositions of this invention at a concentration anywhere from about 0.1 to 5.0 weight percent, based on the weight of the hydrated alumina. Preferably, the first organosilane is present at a concentration of from 0.2 to 2.5 weight percent (same basis).

The second organosilane (i.e. alkyl silane or aryl silane) can be employed at a concentration of from about 0.5 to 5 parts by weight per part of said first organosilane. Preferably, the second organosilane is employed at a concentration of from 1 to 3 parts by weight per part of said first organosilane.

The polyepoxide resin which is employed in the composition of this invention contains at least two vicinal epoxy groups, i.e.

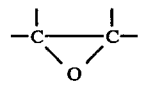

each of which may be in a terminal position, i.e. a

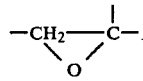

group or in an internal position, i.e. a

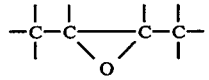

group.

A preferred class of polyepoxide resins in the practice of this invention are polyepoxides having cycloaliphatic structures. The polyepoxides may be substituted with substituents such as hydroxyl, alkyl, alkoxy, etc.

Preferred cycloaliphatic polyepoxides which are contemplated are those which contain at least one oxirane oxygen atom bonded to two vicinal cycloaliphatic carbon atoms. In different language, the polyepoxide component contains at least one vicinal epoxy group, i.e.,

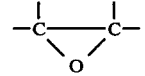

the epoxy carbon atoms of which form a portion of a cycloaliphatic hydrocarbon nucleus. The cycloaliphatic nucleus preferably contains from 5 to 7 carbon atoms including the epoxy carbon atoms.

Saturated polyepoxides which contain all the oxirane oxygen atoms bonded to vicinal cycloaliphatic carbon atoms are preferred. Of course, it is readily apparent to epoxy chemists that only one oxirane oxygen can be chemically bonded to any pair of vicinal or adjacent carbon atoms. Saturated diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides include, for example, the alkanediol bis(3,4-epoxycyclohexane carboxylates), the hexanecarboxylates), the oxaalkanetriol tris(lower alkyl substituted-3,4-epoxycyclohexanecarboxylates), and the like. The expression "lower alkyl" as used herein means an alkyl radical which contains from 1 to 4 carbon atoms.

Other polyepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g.,
bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) tetrahydrophthalate,
bis(3,4-epoxycyclohexylmethyl) hexahydrophthalate,
bis(3,4-epoxycyclohexylmethyl) phthalate, and the like.

Other desirable polyepoxides include the monoesters of 3,4-epoxycyclohexylmethanols and 3,4-epoxycyclohexanecarboxylic acids such as, for example,
3,4-epoxycyclohexylmethyl 3,4-epoxycyclohexanecarboxylate,
1-methyl-3,4-epoxycyclohexylmethyl 1-methyl-3,4-epoxy cyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxy cyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxy-cyclohexanecarboxylate,
2-bromo-3,4-epoxycyclohexylmethyl 2-bromo-3,4-epoxy-cyclohexanecarboxylate, and the like.

Curing agents for the foregoing polyepoxides include suitable curing catalysts and/or organic hardeners or other organic compounds which are coreactive with the polyepoxide resin, including plasticizers and flexibilizers.

Basic and acidic catalysts which can be employed in the curable compositions include, for example, the metal halide Lewis acids, e.g., boron trifluoride, aluminum chloride, zinc chloride, stannic chloride, ferric chloride, uranyl nitrate, boron-trifluoridepiperidine complex, boron trifluoride-1,6-hexanediamine complex, boron trifluoride-monoethylamine complex, boron trifluoride-dimethyl ether complex, boron trifluoridediethyl ether complex, boron trifluoride-dipropyl ether complex, and the like; the strong mineral acids, e.g. sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalene-sulfonic acid, lower alkyl substituted-benzenesulfonic acid, lower alkyl substituted-benzene-sulfonic acid, and the like; tertiary and quaternary amines and salts thereof, e.g., alphamethylbenzyldimethylamine, dimethylethylamine, triethylamine, tripropylamine, trimethylammonium hydroxide, trimethylammonium chloride, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexaneone, and the like.

Where a catalyst is utilized, the amount employed will, of course, vary depending upon the particular catalyst selected and the nature of the polyepoxide. Generally, the amount of catalyst used will be up to about 10 percent by weight of the polyepoxide.

Hardeners and other organic compounds that may be used to cure the polyepoxide include various polyfunctional materials capable of reacting with the polyepoxide, such as, e.g., polycarboxylic acids (including polycarboxy polycaprolactone); polyols such as polyhydric alcohols, polyhydric phenols, polycaprolactone polyols; polycarboxylic acid anhydrides; etc.

Polycarboxylic acid anhydrides constitute a preferred class of hardeners. Suitable polycarboxylic acid anhydrides include the aliphatic, aromatic, and cycloaliphatic acid anhydrides. Illustrative polycarboxylic acid anhydrides include for example, phthalic anhydrides, tetrahydrophthalic anhydride, methyltetrahydrophthalic anhydride, hexahydrophthalic anhydride, chlorendic anhydride, glutaric anhydride, adipic anhydride, 1,2-naphthalic anhydride, adipic anhydride, 1,2-naphthalic anhdride, and the like.

Suitable polyols which may be employed as a component in the curable formulation include those organic compounds which have at least two hydroxy groups, which are alcoholic hydroxy groups, phenolic hydroxy groups, or both alcoholic and phenolic hydroxy groups. The term "polyol" preferably encompasses the polyhydric alcohols and the polyhydric phenols. The polyhydric alcohols, i.e., those composed solely of carbon, hydrogen and oxygen, are highly preferred. Illustrative of the polyols contemplated include, for example, the aliphatic and cycloaliphatic polyhydric alcohols, e.g., ethylene glycol, diethylene glycol, the polyethylene glycols, 1,2-propylene glycol, the poly-1,2-propylene glycols, the polyethylenepoly-1,2-propylene glycols, trimethylene glycol, the butanediols, the pentanediols, 2-ethyl-1,3-hexanediol, the hexanediols, 2-methoxy-2,3-dimethyl-1,5-pentanediol, glycerol, 1,1,1-trimethylolpropane, penaerythritol, sorbitol, the polyvinyl alcohols, resorcinol, catechol, pyrogallol, hydroquinone, the dihydroxytoluenes, dihydroxyxylene, 1,9-naphthalenediol, polytetramethyleneoxide diols and the like. The alkylene oxide adducts, e.g., ethylene oxide, 1,2-propylene oxide, etc., of polyhydric alcohols or polyhydric phenols such as those illustrated above, especially poly(oxypropylene) triols, also are highly suitable. Mixtures of such polyols are also suitable.

The initiated polycaprolactone polyols and/or polycaprolactone polycarboxys (hereinafter termed initiated products for sake of brevity) which contain free hydroxyl groups and/or carboxyl groups represent preferred polyols. These initiated products are formed by reacting, at an elevated temperature, for example, at a temperature of from about 50° C. to about 250° C., an admixture containing a lactone and polyfunctional organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least two reactive hydrogen substituents preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy groups at one end, a carbonyl group at the other end, and an intermediate chain of from five to seven carbon atoms which has at least one hydrogen substituent on the carbon atom in said intermediate chain that is attached to said terminal oxy group. These initiated products will contain at least two hydroxyl groups and/or at least two carboxyl groups or mixtures of such groups, depending, of course, on the initiator and reactants employed. A more complete discussion of such polycaprolactone polyols and polycaprolactone polycarboxy is given in U.S. Pat. No. 3,169,945, the contents of which are incorporated herein by reference.

It is desirable that the relative proportions of polyepoxide, polycarboxylic acid anhydride, and polyol comprising the curable composition are such as to provide from about 0.16 to about 5.0 carboxy groups, —COOH, of said anhydride and up to about 1.0 hydroxy groups, —OH, of said polyol per epoxy group of said polyepoxide.

It should be noted that by the expression "carboxyl groups of said polycarboxylic acid anhydride" is meant the carboxy groups which would be contained by the corresponding polycarboxylic acid. In other words, by the expression "carboxy groups of polycarboxylic acid anhydride" is meant the carboxyl groups contained in the "hydrated" polycarboxylic acid anhydride.

It is preferred that the relative proportions of polyepoxide, polycarboxylic acid anhydride, and polyol are such as to provide from about 0.33 to about 1.0 carboxy groups of said anhydride and from about 0.16 to about 1.0 hydroxy of said polyol, per epoxy group of said polyepoxide.

The two organosilanes can be applied to the surfaces of the hydrated alumina particles by any convenient means such as by uniformly spraying them onto the particles. The organosilanes can be applied neat or in the form of a solution in a conventional inert solvent such as toluene, methyl ethyl ketone, and the like. If a solvent is employed, then the solvent is subsequently removed from the surface of the filler by evaporation. The two organosilanes can be premixed prior to application to the hydrated alumina or they can be simultaneously sprayed onto the hydrated alumina or they can be sequentially applied thereto.

As those skilled in the epoxy art are aware, the components which form the curable polyepoxide composition are often provided in the form of two "packages" which are brought together, for example by metered mixing, just prior to molding and curing. Typically, one package contains a polyepoxide resin and an organic polyol, and the other package contains a polycarboxylic acid anhydride and a cure catalyst. The hydrated alumina having the two organosilanes on its surface can be preblended with one or both packages prior to bringing them together. Alternatively, the two packages can be brought together and the hydrated alumina can then be blended with them prior to curing. It is preferred that the hydrated alumina be dispersed using high shear mixing equipment such as a Cowles mixer.

The amount of hydrated alumina filler which can be incorporated in the improved polyepoxide compositions of this invention varies widely. Generally, the hydrated alumina will comprise from about 10 to 75 weight percent of the filled composition. A more preferred range for the hydrated alumina filler is from 20 to 70 weight percent of the filled composition, with 40 to 65 weight percent being most preferred. A chief benefit of this invention is to allow the use of high filler loadings to maximize arc and tracking resistance without significantly sacrificing in terms of resin handling characteristics or physical properties.

The improved compositions of this invention containing the treated filler can be formed into shaped articles using any of the conventional techniques known in the art such as casting, molding, impregnating, dipping, encapsulating, etc.

The examples which follow illustrate the unexpected combination of handling characteristics and physical and electrical properties displayed by epoxy systems filled with hydrated alumina having the dual organosilane treatment described herein.

The apparatus which was used to measure the flow characteristics of the compositions of this invention consisted of a 250-ml. separatory funnel having a tube with a 3-mml. inside diameter extending vertically downward from its exit port. A stopcock located at the juncture of the separatory funnel and the vertical tube controlled the flow of fluid from the funnel into the tube. With the stopcock closed, an 80-ml. sample of the fluid to be tested was placed in the separatory funnel. The stopcock was then opened, allowing the fluid to flow down into the tube, and a stopwatch was simultaneously started. The time required for the leading edge of the fluid to flow downward to a point in the tube 24 cm. below the stopcock was measured.

The procedure used to determine thermal shock resistance (TSR) is a modification of the Olypant Washer Test described in National Conference on the Application of Electrical Insulation, 1958, Paper No. 85, pp. 1113–35. In the modified test, a common steel washer is used in place of a milled washer and the washer is supported in the center of the casting by a ¼ in. high ring of filter paper. The casting is subjected to a series of 10 hot/cold cycles, each hot cycle extending 30 minutes and each cold cycle 10 minutes. The first hot cycle is at 60° C. and the first cold cycle is at 20° C. Thereafter, each hot cycle is increased by 20° C. and each cold cycle decreased by 10° C. The specimens are examined for cracks after the cold cycle and immediately returned to the oven and the number of specimens failing at each cycle is recorded. A rating value from 1 to 10 is then given, representing the average number of cycles to failure. The procedure is more fully described in a pamphlet entitled "Simplified Test For Evaluation of Epoxy Thermal Shock Resistance" published by Union Carbide Corp., Electrical and Electronic Materials, New York, N.Y.

The following properties were determined by the standard test procedures indicated:

| | |
|---|---|
| Shore D hardness | ASTM D-648-56 |
| Dielectric constant (DC) | ASTM D-150-65T |
| Dissipation factor (DF) | ASTM D-150-65T |
| Loss Factor (LF) | ASTM D-150-65T |

In the examples, the designations given in the left hand column below are used to identify the organosilanes indicated in the right hand column.

A. beta(3,4-epoxycyclohexyl)ethyltrimethoxysilane
B. gamma-glycidoxypropyltrimethoxysilane
C. n-octyltriethoxysilane
D. n-octadecyltriethoxysilane
E. phenyltriethoxysilane
F. methyltriethoxysilane

EXAMPLES

Flow Properties

A series of eight polyepoxide resin compositions filled with alumina trihydrate having the dual organosilane treatment of this invention were prepared. In each composition the alumina trihydrate constituted 50% by weight of the total composition. Each of the compositions was prepared by mixing the following components, in the amounts indicated, in a Cowles mixer.

| | Grams |
|---|---|
| 3,4-epoxycyclohexylmethyl-3,4-epoxycyclohexane carboxylate | 140 |
| Poly(oxypropylene) triol[1] | 32.9 |
| Poly(oxypropylene)triol[2] | 32.9 |
| Alumina trihydrate[3] | 205.8 |

[1]A triol having a molecular weight of 710 and sold under the product name LHT-240 by Union Carbide Corporation
[2]A triol having a molecular weight of 5,000 and sold under the product name LHT-34 by Union Carbide Corporation
[3]Alcoa C-331

In addition to the eight polyepoxide resin compositions in which the alumina trihydrate had received the dual organosilane treatment of this invention, a series of control compositions, identified as C-1 through C-7, were prepared. In the control compositions, the alumina trihydrate either had no organosilane treatment or was treated with a single organosilane. In all cases where the alumina trihydrate was treated, the total amount of organosilane(s) applied to the alumina trihydrate was 1% by weight of the alumina trihydrate.

The procedure employed to treat the alumina trihydrate in the examples was as follows:

Approximately 3,500 to 4,000 c.c. of alumina trihydrate was weighed and charged to a Patterson-Kelly Model LB-S-8 twin shell blender. An amount of organosilane or mixture of organosilanes equal to 1% by weight of the charged alumina trihydrate was diluted to about 150 grams of solution in a mixture of 10% water and 90% methanol. With the intensifier bar operating, the solution was drained into the blender through the hollow intensifier bar over a period of about 5 minutes. Mixing was continued for about 5–10 minutes after the solution was fully charged. The moist alumina trihydrate was then dumped into a drying pan and dried in a forced air oven at 105° C. to remove the solvent.

The table below indicates which organosilanes, if any, were applied to the alumina trihydrate filler in each of the compositions. In the instances where two organosilanes were applied, the relative proportions of each organosilane, by weight, are also given. Each of the compositions containing alumina trihydrate was tested for flow at room temperature using the method previously described. The time, in seconds, required for each of the compositions to reach the 24 cm. mark in the tube is given in the table. Also given in the table is the expected flow time for each of the compositions having a dual silane treatment on the filler. The expected flow time was determined by calculating a weighted average of the flow times measured in the control compositions which employed the individual silanes. For example, the expected flow time for a composition in which the filler is treated with 1 part of organosilane A and 3 parts organosilane C is calculated as ¼ the flow time for a control in which the filler is treated with organosilane A plus ¾ the flow time of a control in which the filler is treated with organosilane C. The results are presented in the table below.

| Example No. | Organosilane treatment | | Expected flow sec. | Actual flow, sec. |
|---|---|---|---|---|
| C-1 | | None | — | 231 |
| C-2 | | A | — | 473 |
| C-3 | | B | — | 399 |
| C-4 | | C | — | 197 |
| C-5 | | D | — | 193 |
| C-6 | | E | — | 165 |
| C-7 | | F | — | 255 |
| 1 | 1:3 | A/C | 266 | 168 |
| 2 | 1:1 | A/C | 335 | 205 |
| 3 | 1:1 | B/C | 298 | 168 |
| 4 | 1:3 | B/C | 247 | 148 |
| 5 | 1:3 | B/D | 244 | 211 |
| 6 | 1:3 | B/E | 223 | 152 |
| 7 | 1:3 | B/F | 291 | 170 |
| 8 | 1:3 | A/C* | 266 | 215 |

*1 part alumina trihydrate treated with 1% A and 3 parts alumina trihydrate treated with 1% C.

Not only did the compositions containing the dual silane treated alumina trihydrate display better flow properties than were predictable based on the properties of the compositions containing the individual-silane treated alumina trihydrate, but also in a number of instances the composition with the dual-silane treated filler had better flow properties than either of the compositions containing the corresponding individual silanes. That is, the combination of the two silanes imparted better flow properties than either of the silanes at the same overall concentration.

The following examples illustrate the effect of the dual silane treatment of this invention on alumina trihydrate filled polyepoxide systems which contain a hardener. Using a procedure similar to that described in the previous examples, polyepoxide systems containing 50 weight percent alumina trihydrate as filler were prepared as indicated in the table below and tested for flow properties. The systems containing methyl tetrahydrophthalic anhydride as hardener were tested for flow properties the same day, whereas the compositions containing hexahydrophthalic anhydride were held for two days prior to testing their flow properties. The alumina trihydrate fillers in the various compositions were treated with 1% organosilane A; 1% organosilane C; and 1% of a 1:3 mixture of organosilanes A and C. The observed flow times of the compositions are given below. Based on the observed flow times for the compositions in which the fillers were treated with organosilane A and organosilane C, individually, the expected flow times for compositions in which the fillers were treated with a 1:3 mixture of organosilanes A and C were calculated and appear below. It can be seen that the actual flow times for the compositions containing the dual silane treated fillers were considerably less than expected.

| Component | Grams | |
|---|---|---|
| | I | II |
| 3,4-epoxycyclohexyl-3,4-epoxy-cyclohexane carboxylate | 140 | 140 |
| Poly(oxypropylene)triol (LHT-240) | 34 | 32.9 |
| Poly(oxypropylene)triol (LHT-34) | 34 | 32.9 |
| Hexahydrophthalic anhydride | — | 123.2 |
| Methyltetrahydrophthalic anhydride | 132 | — |
| Alumina trihydrate | 340 | 329 |

| Composition No. | Organosilane on filler (1%) | Observed flow, sec. | Expected flow, sec. |
|---|---|---|---|
| I | A | 473 | — |
| I | C | 197 | — |
| I | 1:3 A/C | 205 | 266 |
| II | A | 473 | — |
| II | C | 147 | — |
| II | 1:3 A/C | 162 | 228 |

Mechanical and Electrical Properties

A series of curable epoxy resin systems were prepared which contained the following components in the indicated amounts.

| Component | Grams |
|---|---|
| 3,4-epoxycyclohexylmethyl-3,4-epoxy-cyclohexane carboxylate | 140 |
| Poly(oxypropylene)triol (LHT-240) | 32.9 |
| Poly(oxypropylene)triol (LHT-34) | 32.9 |
| Hexanhydrophthalic anhydride | 123.2 |
| Alumina trihydrate | 494.1 |
| Quaternary ammonium hydroxide (catalyst) | 0.6 |

The first four components were mixed and heated to 80° C. The alumina trihydrate was heated to 100° C. All the components except the catalyst were mixed under high shear in a Cowles mixer and the mixture was dearated. Finally, the catalyst was added and the mixture was again mixed in the Cowles mixer and dearated. The mixture was then cast into molds containing steel washer inserts to produce test samples for the modified Olyphant Washer Test for thermal shock resistance. The molded parts were cured for 2 hours at 100° C. followed by 4 hours at 160° C.

A series of TSR test samples were prepared in the above manner using alumina trihydrate particles treated with a variety of organosilane pretreatments (1% organosilane by weight of alumina trihydrate). As in the compositions prepared for testing flow properties, control compositions were prepared in which the alumina trihydrate was treated with a single organosilane. The table below indicates the nature of the organosilane treatment on the alumina trihydrate and the thermal shock resistance achieved.

| Organosilane treatment | | TSR |
|---|---|---|
| | None | 4.5 |
| | A | 7.4 |
| | B | 8.4 |
| | C | 9.1 |
| | D | 9.3 |
| | E | 5.1 |
| | F | 6.7 |
| 1:3 | A/C | 8.1 |
| 1:1 | A/C | 9.4 |
| 1:1 | B/C | 9.8 |
| 1:3 | B/C | 8.4 |
| 1:3 | B/D | 8.3 |
| 1:3 | B/E | 8.0 |
| 1:3 | B/F | 7.5 |

In order to determine the hydrolytic stability in terms of hardness and electrical properties, a series of polyepoxide resin compositions containing 60% alumina trihydrate filler were prepared by a procedure similar to that used to prepare the TSR test samples except that 0.99 grams of catalyst and 495 grams of alumina trihydrate were employed in the formulation. Compositions were prepared using untreated alumina trihydrate; alumina trihydrate treated with 1% by weight of organosilane A; alumina trihydrate treated with 1% by weight organosilane C; and alumina trihydrate treated with 1% by weight of a mixture of 1 part organosilane A and 3 parts organosilane C.

The polyepoxide resin compositions were cast into molds to produce test specimens and then cured for 2 hours at 120° C. Cured test specimens were tested for dielectric constant, dissipation factor, loss factor (determined as the product of dielectric constant and dissipation factor), and Shore hardness. Some of the specimens were place in an autoclave for 144 hours at 15 p.s.i.g. and 125° C. prior to testing. The results appear in the table below.

| Organosilane treatment (1%) | None | A | C | 1:3 A/C |
|---|---|---|---|---|
| Prior to Autoclave | | | | |
| DC | 4.72 | 4.91 | 6.23 | 5.12 |
| DF | .094 | .091 | .185 | .099 |
| LF | .444 | .447 | 1.15 | .506 |
| Shore D hardness | 86 | 85 | 85 | 87 |
| After Autoclave | | | | |
| DC | 46.8 | 40.6 | 48.0 | 24.9 |
| DF | .411 | .427 | .507 | .41 |
| LF | 19.2 | 17.3 | 24.3 | 10.2 |
| Shore D hardness | 75 | 76 | 75 | 83 |
| Δ LF | 18.8 | 16.8 | 23.2 | 9.7 |
| % hardness retention | 87.2 | 89.4 | 88.2 | 95.4 |
| Weight gain, % | 3.5 | 2.5 | 3.6 | 2.4 |

Various modifications and variations of this invention will be obvious to a worker skilled in the art and it is to be understood that such modifications and variations are to be included within the purview of this application and the spirit and scope of the appended claims.

It is claimed:

1. A composition comprising:
   (A) a curable cycloaliphatic polyepoxide resin;
   (B) a curing agent for said polyepoxide resin;
   (C) a particulate hydrated alumina filler of the formula $Al_2O_3 \cdot xH_2O$, wherein x has a value from 1 to 3;
   (D) a first organosilane of the formula $XRSiY_3$, wherein R is a saturated hydrocarbon radical containing at least 2 carbon atoms in sequence separating X from Si and is bonded to both; X is an organic group which contains a vicinal epoxy group, and Y is hydroxyl or a hydrolyzable group, said first organosilane being present at a concentration of from 0.1 to 5.0 weight percent, based on the weight of the hydrated alumina filler; and
   (E) a second organosilane having the formula $R'SiY_3$ wherein Y is hydroxyl or a hydrolyzable group and R' is alkyl from 1 to 18 carbon atoms or

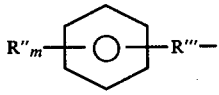

wherein R''' is alkylene of 1 to 8 carbon atoms, alkyleneoxy of 1 to 8 carbons, or a valence bond, R'' is alkyl of 1 to 8 carbon atoms, and m has a value from 0 to 2, said second organosilane being present at a concentration of from 0.5 to 5 parts by weight per part of said first organosilane.

2. A composition as claimed in claim 1, wherein said first organosilane is present at a concentration of from 0.2 to 2.5 weight percent, based on the weight of the hydrated alumina filler, and said second organosilane is present at a concentration of from 1 to 3 parts per part of said first organosilane.

3. A composition as claimed in claim 1, wherein said hydrated alumina filler is present at a concentration of from 10 to 75 weight percent, based on the total weight of the composition.

4. A composition as claimed in claim 2, wherein said hydrated alumina filler is present at a concentration of from 10 to 75 weight percent, based on the total weight of the composition.

5. A composition as claimed in claim 1, wherein said hydrated alumina is present at a concentration of from 20 to 70 weight percent, based on the total weight of the composition.

6. A composition as claimed in claim 1, wherein said hydrated alumina is present at a concentration of from 40 to 65 weight percent, based on the total weight of the composition.

7. A composition as claimed in claim 3, wherein said polyepoxide is a saturated polyepoxide having at least one oxirane oxygen which is bonded to two vicinal carbon atoms which form a portion of a cycloaliphatic hydrocarbon nucleus.

8. A composition as claimed in claim 7, wherein said polyepoxide is 3,4-epoxycyclohexylmethyl-3,4-epoxycyclohexane-carboxylate.

9. A composition as claimed in claim 3, wherein said composition contains a polycarboxylic acid anhydride as a hardener.

10. A composition as claimed in claim 9, wherein there is additionally present an organic polyol modifier.

11. A composition as claimed in claim 9, wherein said polycarboxylic acid anhydride is hexahydrophthalic anhydride.

12. A composition as claimed in claim 1, wherein said hydrated alumina filler is alumina trihydrate.

13. A composition as claimed in claim 9, wherein the amount of said polycarboxylic acid anhydride is sufficient to provide from 0.16 to 1.0 carboxy groups per epoxy group of said polyepoxide.

14. A composition as claimed in claim 10, wehrein the amount of said polyol is sufficient to provide up to about 1.0 hydroxy groups per epoxy group of said polyepoxide.

15. A composition comprising:
   (A) a curable cycloaliphatic polyepoxide in which at least one oxirane oxygen is bonded to two vicinal carbon atoms which form a portion of a cycloaliphatic hydrocarbon nucleus;
   (B) a polycarboxylic acid anhydride in an amount sufficient to provide from 0.16 to 1.0 carboxy groups per epoxy groups of said cycloaliphatic polyepoxide;
   (C) an organic polyol in an amount sufficient to provide up to 1.0 hydroxy groups per epoxy group of said polyepoxide;
   (D) from 0 to 10 percent by weight of said cycloaliphatic polyepoxide of a cure catalyst therefor;
   (E) from 10 to 75 percent by weight, based on the total weight of the composition, of alumina trihydrate;
   (F) from 0.1 to 5.0 weight percent, based on the weight of alumina trihydrate, of an epoxy-functional organosilane having three hydroxyl or hydrolyzable groups bonded to the silicon atom; and
   (G) from 0.5 to 5 parts by weight per part of said epoxy-functional organosilane of an alkyl silane having a 1 to 18 carbon alkyl group bonded to the silicon atom and three hydroxyl or hydrolyzable groups bonded to the silicon atom.

16. A composition as defined in claim 15, wherein the epoxy-functional silane (F) is beta-(3,4-epoxycyclohexyl)ethyltrimethoxysilane and the alkyl silane (G) is n-octyltriethoxysilane, and wherein said alkyl silane (G) is present at a concentration of about 3 parts by weight per part of said epoxy-functional silane (F).

17. A composition as defined in claim 15, wherein the epoxy-functional silane (F) is gamma-glycidoxypropyltrimethoxysilane and the alkyl silane (G) is n-octyltriethoxysilane, and wherein said alkyl silane (G) is present at a concentration of about 3 parts by weight per part of said epoxy-functional silane (F).

* * * * *